(12) United States Patent
Lee et al.

(10) Patent No.: US 12,278,542 B2
(45) Date of Patent: *Apr. 15, 2025

(54) GENERATOR FOR CLEAN, RENEWABLE, AND SUSTAINABLE POWER GENERATION

(71) Applicant: EKO KUASA TECHNOLOGY SDN BHD, Selangor (MY)

(72) Inventors: Koh Yung Lee, Puchong (MY); Muhammad Sir Raphael Bin Abdullah, Puchong (MY)

(73) Assignee: Eko Kuasa Technology Sdn Bhd, Selangor (MY)

( * ) Notice: Subject to any disclaimer, the term of this patent is extended or adjusted under 35 U.S.C. 154(b) by 0 days.

This patent is subject to a terminal disclaimer.

(21) Appl. No.: 18/688,746

(22) PCT Filed: Aug. 30, 2022

(86) PCT No.: PCT/MY2022/050079
§ 371 (c)(1),
(2) Date: Mar. 1, 2024

(87) PCT Pub. No.: WO2023/033643
PCT Pub. Date: Mar. 9, 2023

(65) Prior Publication Data
US 2024/0372453 A1    Nov. 7, 2024

(30) Foreign Application Priority Data

Sep. 3, 2021 (MY) .............................. PI2021005066
Jul. 29, 2022 (MY) .............................. PI2022004076

(51) Int. Cl.
*H02K 53/00* (2006.01)
*H02K 9/04* (2006.01)
*H02K 11/20* (2016.01)

(52) U.S. Cl.
CPC ............... *H02K 53/00* (2013.01); *H02K 9/04* (2013.01); *H02K 11/20* (2016.01); *H02K 2213/03* (2013.01); *H02K 2213/12* (2013.01)

(58) Field of Classification Search
CPC .......... H02K 53/00; H02K 11/20; H02K 9/04; H02K 2213/03; H02K 2213/12
See application file for complete search history.

(56) References Cited

U.S. PATENT DOCUMENTS

2019/0341827 A1* 11/2019 Fung ....................... H02K 5/16
2024/0291352 A1*  8/2024 Bin Abdullah ........ H02K 11/04

OTHER PUBLICATIONS

International Search Report for corresponding International Patent Application No. PCT/MY2022/050079, dated Dec. 12, 2022.

* cited by examiner

*Primary Examiner* — Viet P Nguyen
(74) *Attorney, Agent, or Firm* — LOZA & LOZA, LLP; Michael Fedrick

(57) ABSTRACT

A generator including at least one machine device with a drive shaft; at least one flywheel connected to the drive shaft; at least one stator and rotor, wherein the drive shaft of the machine device is operable to synchronously rotate at least one rotor. The flywheel has one or more layers of arrays, or evenly spaced around magnetic field means, adapted for magnetic interaction with energizing coils of at least one support (360) so as to induce rotation of the flywheel in a single direction to rotate the rotor. The stator has an armature with a plurality of winding field coils evenly spaced apart around its circumference projected winding teeth. Each winding field coil is adapted to serve as a collecting energizing coil or an electromagnet coil. The rotor includes an array of the magnetic field generating means evenly spaced apart around its inner circumference surface.

18 Claims, 7 Drawing Sheets

GENERATOR FOR CLEAN, RENEWABLE, AND SUSTAINABLE POWER GENERATION

CROSS-REFERENCE TO RELATED APPLICATIONS

This application is the U.S. national stage of International Patent Application No. PCT/MY2022/050079, filed on Aug. 30, 2022, which claims the benefit of priority under 35 U.S.C. § 119 from Malaysian Patent Application No. PI2021005066, filed on Sep. 3, 2021, and from Malaysian Patent Application No. PI2022004076, filed on Jul. 29, 2022. The disclosures of the foregoing applications are incorporated herein by reference in their entireties.

FIELD OF INVENTION

The present invention relates to a generator, and more particularly to a generator for clean, renewable, and sustainable power generation.

BACKGROUND OF INVENTION

Global warming has become a very critical and important issue during the last decade. One of the reasons was due to the weighty usage of fuel power machines around the globe. Conventional fuel power machines such as fossil fuel generators are of debatable utility to meet future electricity demands as they are the major emitters of carbon dioxide ($CO_2$) that contribute to the greenhouse effect, believed to be among the principal contributors to climate change and air pollution. These human-caused greenhouse gas emissions could be a major contributor to global warming. Moreover, mankind is in order to obtain the high demand of the fuel sources, proposes of earth's crust, extraction and excavation to the earth may substantially cause serious air pollution, natural and ecological unbalance such that leaving to an unhealthy environment with increasing threat and challenge.

In order to mitigate air pollution and climate change, an effective renewable and sustainable energy approach are required to meet the energy demand for future usages. In view of this, worldwide research gradually oriented to obtain efficiency improvements on energy-consuming and sustainable energy source utilization.

In some conventional design paradigms, certain drawbacks may be detected from the operation of some conventional renewable and sustainable source machine generators. Among the drawbacks may include, such as for example, but not limited to, the instability of the machine generator, difficulty in maintaining as it requires exertion work in maintenance, substantial vibration due to occurrence of resonances, unstable and/or inefficiency in power output. As such, special care is needed to safeguard the proper operation of the machine generator.

Various attempts have been made to improve the stability and efficiency of the machine generator. However, most attempts have not been completely satisfactory for one or more reasons. For example, some machine generators are unsatisfactory due to their complex designs, configurations, materials, or parts that appear to have certain drawbacks, such that they have not become widely used. Some other attempts may involve a significant cost to mitigate resonances and to ensure the proper operation and working effectiveness of the machine generator, such that it may require excessive supervision in maintenance. Moreover, certain parts of the machine generator may be too compact and unreachable such that making the maintenance work even more challenging and time-consuming.

In view of the foregoing and other shortcomings, it is desirous to provide an effective generator for clean, renewable, and sustainable power generation, and yet enabled to overcome the aforementioned limitations and drawbacks. Accordingly, the present invention is adapted to overcome one or more of the foregoing drawbacks and the issues relative to the conventional designs or prior arts in an efficient and cost-effective manner. The present invention and its combination of features thereof will be described and exemplified in the detailed description.

SUMMARY OF THE INVENTION

The present invention generally relates to a generator for clean, renewable, and sustainable power generation. Accordingly, the generator includes: a) at least one machine device with a drive shaft; b) at least one flywheel connected to the drive shaft; c) at least one stator and rotor; wherein the drive shaft of the at least one machine device is operable to synchronously rotate at least one rotor of the generator; wherein the flywheel has one or more layers of arrays, or evenly spaced around magnetic field means, adapted for magnetic interaction with energizing coils of at least one support so as to induce rotation of the flywheel in a single direction to rotate the rotor; wherein the at least one stator of the generator has an armature with a plurality of winding field coils evenly spaced apart around its circumference projected winding teeth, and each winding field coil is adapted to be served as a collecting energizing coil or an electromagnet coil; and wherein the at least one rotor of the generator includes an array of the magnetic field generating means evenly spaced apart around at its inner circumference surface, said rotor is adapted to serve as a flywheel such that allowing it to eliminate magnetic flux friction caused by the sudden load and therefore lighten the rotation of the rotor.

In the preferred exemplary of the present invention, the at least one machine device is connected to at least one power source operable to static start the machine device to rotate the drive shaft. It will be appreciated that the at least one machine device is a rotating machine that can alternately serve as a drive motor or a generator, depending on the operating conditions. Accordingly, the at least one machine device is adapted to be temporarily operated as a motor with an electrical supply from the power source in order to static start the drive shaft and accelerate the rotational speed of at least one rotor to sufficiently start the generator. The at least one machine device is able to switch back to working as a generator once the generator begins operable to supply electric power back to the machine device.

By way of example but not limitation, the layer of arrays, or evenly spaced around magnetic field means of the flywheel is configured with an offset angle of 18 to 25 degrees, and more preferably 20-degree. Optionally, the magnetic field means of the flywheel can be a permanent magnet of an iron core, or an energizable coils simulating magnets, or a combination thereof, with the same polarity.

In the preferred exemplary of the present invention, the at least one support has one or more layers of evenly spaced energizing coils that is configured with an offset angle of 18 to 25 degrees, and more preferably 20-degree. It will be appreciated that the energizing coils of the at least one support which are operable as an electromagnet may be replaced by permanent magnet of iron core depending on operating conditions and usage requirements.

It should be noted that the winding field coil of the at least one stator is adapted to be energized by back electromotive force (EMF) more than once in a single revolution of the rotor. The at least one rotor of the generator, which also serves as a flywheel, will accelerate to its rated starting speed whenever the rotational speed of the drive shaft is increased, and such starting speed of at least one rotor enabled the generator to become self-sustaining to generate electric power to drive the machine device through the at least one controller or to channel out the electric power as a power source for other electrical devices.

By way of example and not by way of limitation, the magnetic field generating means of the at least one rotor may be a permanent magnet of an iron core, or a means attractable to a magnetized body, or an electromagnet, or a combination thereof, with north-south polarity. It will be appreciated that the at least one rotor of the generator may further equip with one or more clip blade fans configured on at least one space opening for ventilation purposes, said clip blade fan is adapted to provide an aerodynamic airflow through the at least one space opening of the rotor, such that it is able to reduce the temperature of the winding field coils of the stator.

It should be noted that the generator of the present invention is adapted to convert a rotational speed of at least one rotor to electric current through cross magnetic field excitation between at least one stator and rotor, such that the generator is operable to supply electric power back to the at least one machine device in a closed-loop energy system, or to channel the electric power to at least one power output as a power source for other electrical devices. Accordingly, the electric current is formed by the cross magnetic field excitation which is a result of periodic alignment and misalignment of magnetic poles with north-south polarity in-lines provided on at least one rotor and stator of the generator. The cross magnetic field excitation includes magnetic wave kink flux which is the magnetic field established by the magnetic field generating means or permanent magnets configured at equally spaced intervals, or in descending order from larger to smaller array sequences or vice versa, around the inner circumference drum of the rotor.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

It will be understood that several of the drawings are merely schematic representations of the present disclosure. As such, some of the components may have been distorted from their actual scale for pictorial clarity. The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

Figure 1:
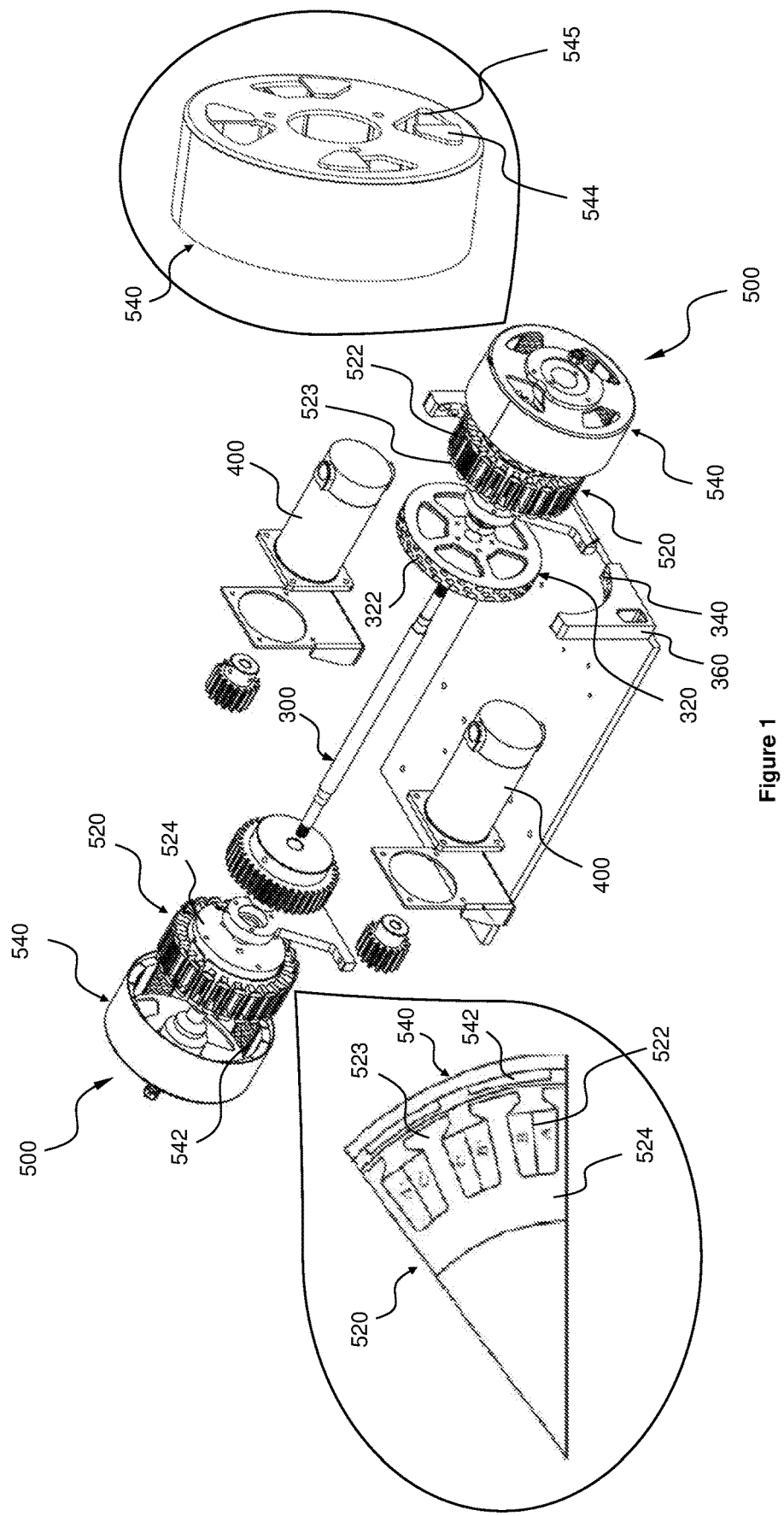
FIG. 1 shows an exploded view of a machine device with a drive shaft, a flywheel connected to the drive shaft, and a generator with at least one stator and rotor according to a preferred exemplary of the present invention.
Figure 2:
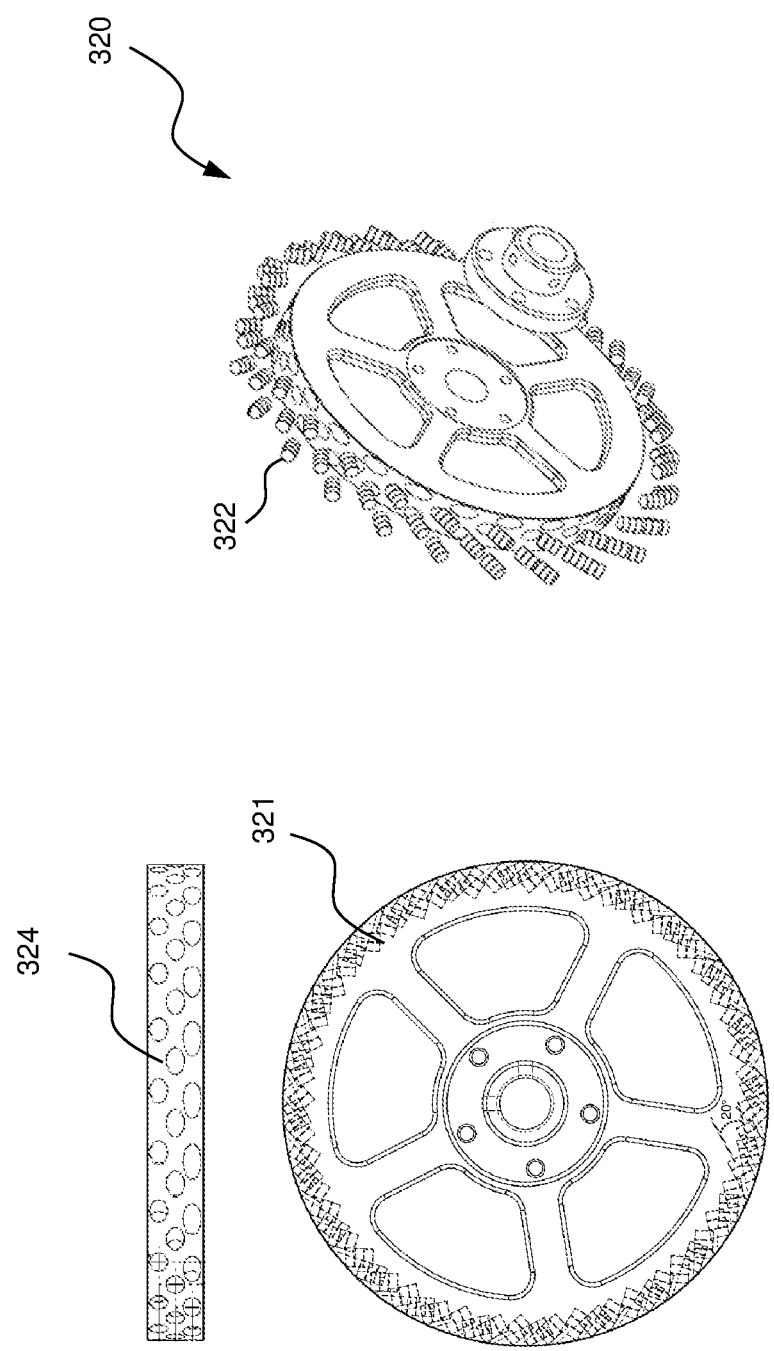
FIG. 2 illustrates an enlarged view of the flywheel with one or more layers of arrays, or evenly spaced around magnetic field means in accordance with the preferred exemplary of the present invention.

The present invention relates to a generator for power generation, and more particularly to a generator for clean, renewable, and sustainable power generation. Hereinafter, this specification will describe the present invention according to the preferred exemplary of the present invention. However, it is to be understood that limiting the description to the preferred exemplary of the invention is merely to facilitate discussion of the present invention and it is envisioned that those skilled in the art may devise various modifications and equivalents without departing from the scope of the appended claims.

The detailed description set forth below in connection with the appended drawings is intended as a description of various exemplary embodiments of the present invention and is not intended to represent the only embodiments in which the present invention may be practiced. In the following description, for the purposes of explanation, specific construction details, arrangements, and materials are set forth in order to provide a more thorough understanding of the present invention. It will be apparent to those skilled in the art, however, that the present invention may be practiced without these specific details. Acronyms and other descriptive terminology may be used merely for convenience and clarity and are not intended to limit the scope of the invention.

The present invention aims to provide a clean and environmentally friendly generator for power generation so as to overcome one or more of the aforementioned limitations and drawbacks. Accordingly, the generator for clean, renewable, and sustainable power generation of the present invention utilizes non-energy sources to avoid polluting the environment and contribute to the creation of a harmonious environment.

The generator in the preferred mode of the invention is simple and effective, relatively inexpensive to configure and install, and customizable to provide clean, renewable, and sustainable power generation. Moreover, the generator of the present invention is able to operate at zero greenhouse gas emissions as compared to other power energy producers. The generator of the present invention also allows for easy maintenance, minimizing shutdown time and maintenance costs while maintaining high dependability of operation.

It should be noted that the generator of the present invention works on the principle of cross magnetic field excitation in between the permanent magnetic field of a rotor and the electromagnetic induction of the stator for the electric current generation. Accordingly, the generator is adapted to convert a rotational speed of the rotor to electric current through cross magnetic field excitation between the stator and the rotor, such that said generator is operable to supply electric power back to at least one machine device, or to a power output as a power source for other electrical devices.

The generator for clean, renewable, and sustainable power generation according to the preferred mode of carrying out the present invention will now be described in accordance with the accompanying drawings FIGS. 1 to 6b, either individually or in any combination thereof.

Referring to FIG. 1, a generator (500) for clean, renewable, and sustainable power generation according to the present invention generally includes at least one machine device (400) with a drive shaft (300), at least one flywheel (320) connected to the drive shaft (300), and at least one stator (520) and rotor (540).

In the preferred exemplary of the present invention, the at least one machine device (400) is connected to at least one power source (not shown). Accordingly, at least one power source is operable to static start the at least one machine device (400) so as to rotate the drive shaft (300). It should be noted that the at least one drive shaft (300) is preferably, but not limited to, being connected to one or more rotors (540), such that it allows synchronous rotation of the rotors (540).

By way of example but not limitation, the at least one power source may either be an electrical supply from at least one power storage or an auxiliary electrical supply in an energy generation system (not shown). Accordingly, the power storage (not shown) may include one or more rechargeable batteries storage or other applicable forms of power storage capable of supplying sufficient power for the static start. The auxiliary electrical supply (not shown) may include electrical supply from direct power source terminal or other applicable forms of power supply. It should be noted that the power source, although exemplary, should not be limited to the abovementioned examples, it may also be altered according to the design or usage requirements. As such, the power source as described herein should not be construed as limiting in any way.

It should be noted that the at least one machine device (400) may be a rotating machine that can alternately serve as a drive motor or a generator, depending on the operating conditions. Accordingly, the at least one machine device (400) is adapted to be temporarily operated as a motor with an electrical supply from the power source in order to static start the drive shaft (300) and accelerate the rotational speed of at least one rotor (540) to sufficiently start the generator (500). The machine device (400) may then be switched back to working as a generator once the generator (500) begins operable to supply electric power back to the machine device (400).

In the preferred exemplary of the present invention, the drive shaft (300) of the at least one machine device (400) is operable to synchronously rotate at least one rotor (540) of the generator (500). It should be noted that the drive shaft (300) is further equipped with at least one flywheel (320). It should be noted that the at least one flywheel (320) has a magnet armature (321), also known as the field structure, provides a constant force magnetic field through the drive shaft (300) rotation in the turning operation. Accordingly, the at least one flywheel (320) is preferably connected to the drive shaft (300) and has one or more layers of arrays, or evenly spaced around magnetic field means (322), adapted for magnetic interaction with energizing coils (340) so as to induce rotation of the flywheel (320) in a single direction to rotate the rotor (540) (see FIGS. 1 and 2). By way of example but not limitation, two or more layers of array-organized magnetic field means (322) may be provided so that they are offset at predefined intervals to generate an alternate sequence (324) for optimum performance (see FIG. 2). It should be noted that the layer of arrays, or evenly spaced around magnetic field means (322) of the flywheel (320) is configured with an offset angle of 18 to 25 degrees, and more preferably 20-degree. By way of example, but not limitation, the magnetic field means (322) of the flywheel (320) may be a permanent magnet of an iron core, or an energizable coils simulating magnets, or a combination thereof, with the same polarity.

Figure 3:
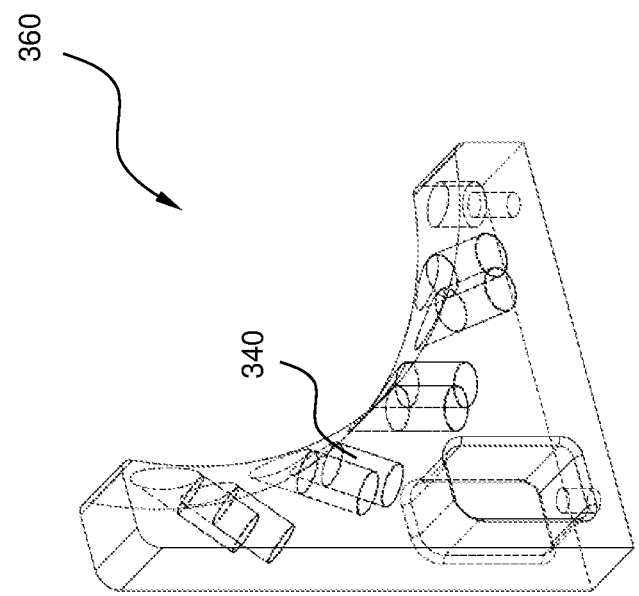
FIG. 3 shows an enlarged view of a support with one or more layers of evenly spaced energizing coils that are configured to interact with the magnetic field means of the flywheel according to the preferred exemplary of the present invention.
Figure 3:
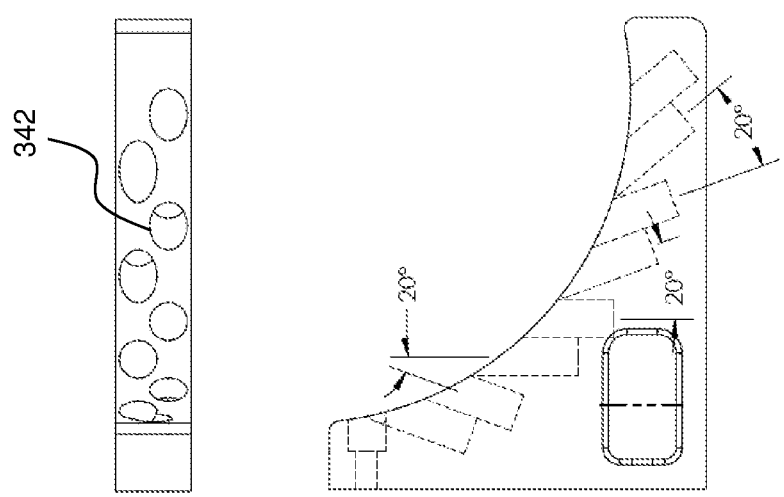

Preferably, but not limited to, the energizing coils (340) of the present invention may be supported by at least one support (360) (see FIGS. 1 and 3). Accordingly, the at least one support (360) has one or more layers of evenly spaced energizing coils (340) that are configured to interact with the magnetic field means (322) of the flywheel (320). Similarly, two or more layers of space-organized energizing coils (340) may be provided such that they are being offset at predefined intervals, forming an alternate sequence (342), for optimum performance (see FIG. 3). It should be noted that the layer of evenly spaced energizing coils (340) in the support (360) is configured with an offset angle of 18 to 25 degrees, and more preferably 20-degree. It will be appreciated that the energizing coils (340) of the support (360) that are operable as an electromagnet may optionally be replaced by permanent magnet of iron core depending on operating conditions and usage requirements.

Figure 4:
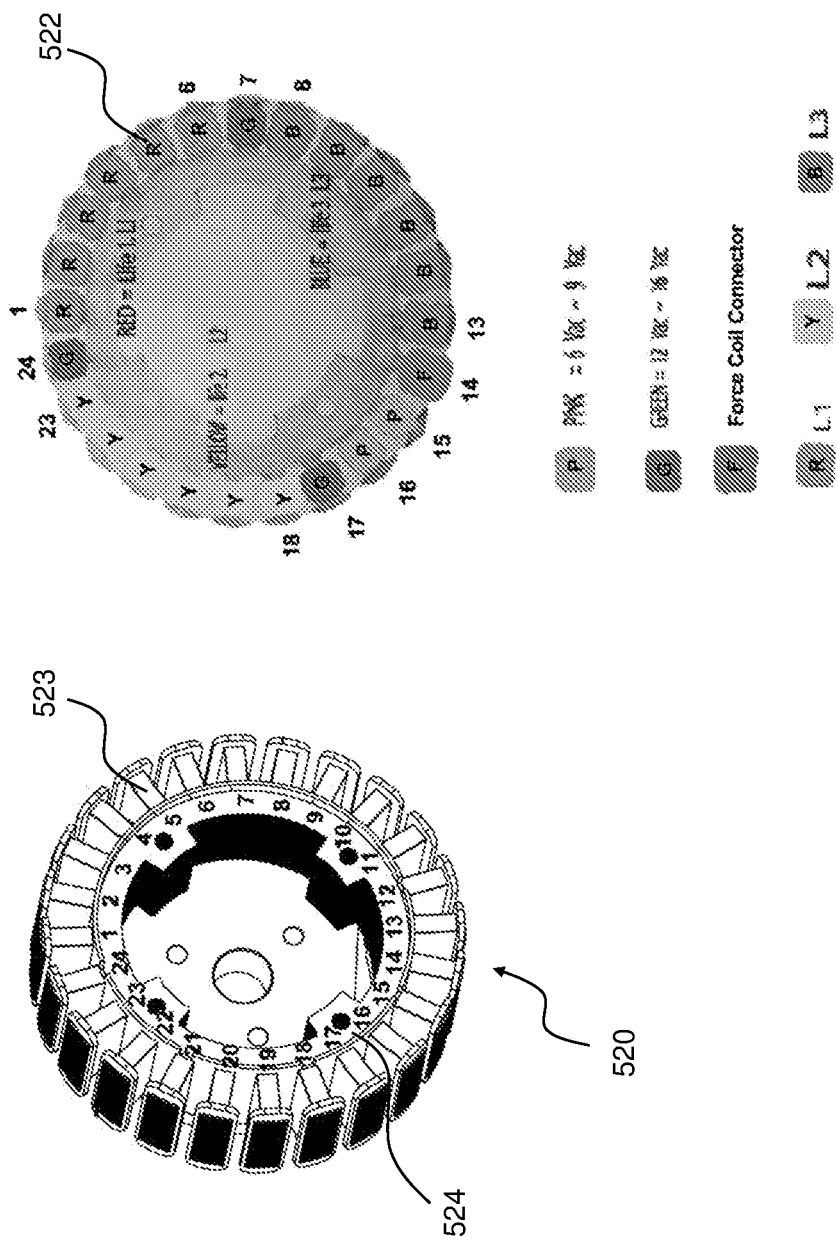
FIG. 4 illustrates an enlarged view of the stator, which has an armature with a plurality of winding field coils evenly spaced apart around its circumference projected winding teeth in accordance with the preferred exemplary of the present invention.

In the preferred exemplary of the present invention, at least one stator (520) of the generator (500) has an armature (524) with a plurality of winding field coils (522) evenly spaced apart around its circumference projected winding teeth (523) (see FIGS. 1 and 4). Accordingly, each winding field coil (522) is preferably, but not limited to be winded to each winding teeth (523) and evenly spaced apart around the circumference of the armature (524). It should be noted that each winding field coil (522) is adapted to be served as a collecting energizing coil or an electromagnet coil. Accordingly, said winding field coil (522) of the stator (520) is adapted to be energized by back electromotive force (EMF) more than once in a single revolution of the rotor (540). It should be noted that the winding field coils (522) of the stator (520), although exemplary, should not be limited to the abovementioned examples, it may also be altered according to the design or usage requirements. As such, the winding field coils (522) of the stator (520) as described herein should not be construed as limiting in any way.

It will be appreciated that the winding field coils (522), which are positioned onto each winding teeth (523), of the stator (520), can be made of any material, including, but not limited to, copper, silver, aluminium, or others conductive material. The shape and section areas of the winding field coils (522) of the stator (520), may vary from round, square, triangular, rectangular, and others as considered appropriate. Other variations of the design configurations such as, for example, but not limited to, the number of turns and layers wound onto the coil and consequent ohms resistance; the method of winding onto each winding teeth (523)—from a single winding, double winding, double winding same direction, double winding opposite direction, left to right and vice versa, and an interwoven winding; may preferably be contemplated, as to whether the above examples to be wound onto a single winding teeth (523), to be the best mode in carrying out the present invention, but should not be construed as limiting in any way.

Figure 5:
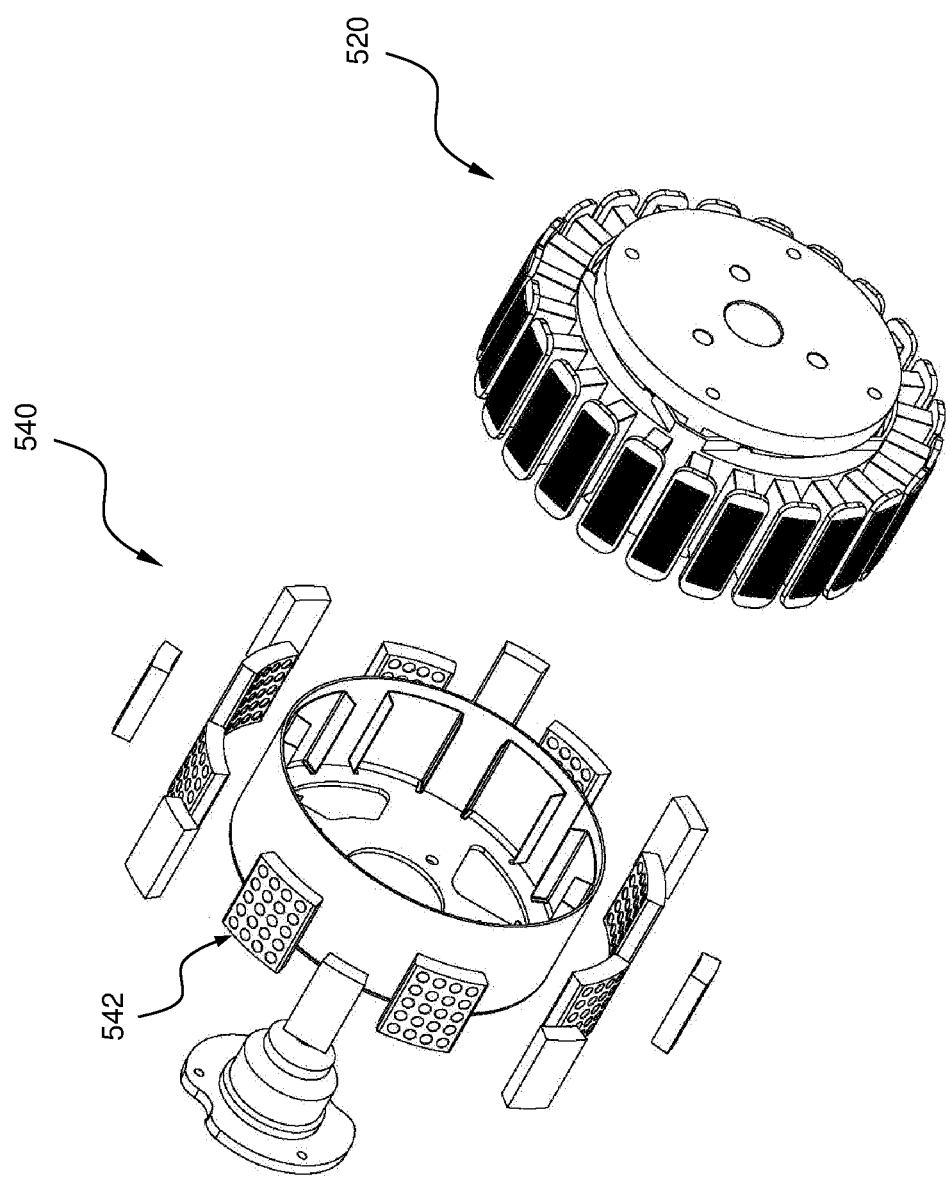
FIG. 5 is an enlarged exploded perspective view of the stator and the rotor with an array of the magnetic field generating means according to the preferred exemplary of the present invention.

It should be noted that at least one rotor (540) of the generator (500) may include an array of the magnetic field generating means (542) evenly spaced apart around at its inner circumference surface (see FIGS. 1 and 5). By way of example but not limitation, the magnetic field generating means (542) of the at least one rotor (540) may be a permanent magnet of an iron core, or a means attractable to a magnetized body, or an electromagnet, or a combination thereof, with north-south polarity. It will be appreciated that the at least one rotor (540) of the generator (500) may further equip with one or more clip blade fans (544) configured on at least one space opening (545) of the rotor (540) for ventilation purposes. Accordingly, the clip blade fan (544) is adapted to provide an aerodynamic airflow through the at least one space opening (545) of the rotor (540), such that it is able to reduce the temperature of the winding field coils (522) of the stator (520).

It should be noted that at least one rotor (540) of the generator (500) is adapted to serve as a flywheel so that allowing it to eliminate magnetic flux friction caused by the sudden load and therefore lighten the rotation of the rotor (540). It must be noted that the magnetic field generating means (542) and the clip blade fans (544) of the rotor (540), although exemplary, should not be limited to the abovementioned examples, it may also be altered according to the design or usage requirements. As such, the magnetic field generating means (542) and the clip blade fans (544) of the rotor (540) as above-described should not be construed as limiting in any way.

By way of example and not limitation, the number of winding field coils (522) in the at least one stator (520) versus the number of the magnetic field generating means (542) in the at least one rotor may possibly be configured in various combinations, but not restricted to the following:

(i) Three magnets in the rotor, one to five stator coils can be used;
(ii) Five permanent magnets in the rotor, one to nine stator coils can be used;
(iii) Eight permanent magnets in the rotor, one to three or nine stator coils can be used; or
(iv) The output varies with each combination.

It will be appreciated that the current output from the at least one stator (520) may be a single-phase or three-phase output. In the preferred exemplary of the present invention, 8 sets of magnetic arrays are provided in the at least one rotor (540); and 24-teeth, 23-winding coils of a 3-phase stator are preferably used (see FIGS. 4 and 5). Accordingly, at least one stator (520) of the generator (500) preferably has a series of 24 sections of winding teeth (523) of which 23 sections are winded with the winding field coil (522) (FIG. 4). The stator (520) is encircled by the rotor (540), which is preferably, but not limited to, a rotary electromagnetic drum. It should be noted that the inner circumference drum of the rotor (540) is preferably equipped with 8 sets of magnetic arrays of the magnetic field generating means (542), evenly spaced apart around its inner circumference surface (FIG. 5).

When the rotor (540) rotates, an electric current will be induced in the winding field coil (522) of the stator (520). It will be appreciated that each section of the winding field coil (522) is a separate electric conductor. The currents induced in the individual winding field coil (522) sections will be combined to form an electric current of about 2800 to 3000 KVA output from each generator (500) configured side by side. The electric current may then be moved through power lines from the winding field coil (522) of the stator (520) to a power breaker unit and voltage stabilizer in the power generation system (not shown) before it is used to loop back inside the system or to output the power that is needed. It should be noted that the aforementioned combinations although exemplary, should not be thereto, it may however be altered according to the design or usage requirements. As such, the mentioned combinations as above-described should not be construed as limiting in any way.

It will be appreciated that the generator (500) of the present invention may effectively function as the reverse of the electric motor. Instead of supplying electricity to the drive motor or machine device (400), preferably, current output to the output circuit is adapted to be used in a close loop to run other electric drive devices in a system. In the preferred exemplary of the present invention, the generator (500) is adapted to convert a rotational speed of at least one rotor (540) to electric current through cross magnetic field excitation between at least one stator (520) and rotor (540), such that the generator (500) is operable to supply electric power back to the at least one machine device (400) in the closed-loop energy system (not shown), or to channel the electric power to at least one power output as a power source for other electrical devices.

It should be noted that whenever the rotational speed of the drive shaft (300) is increased, the at least one rotor (540) of the generator (500), which also serves as a flywheel, will be accelerated to its rated starting speed. Such starting speed of the at least one rotor (540) enabled the generator (500) to become self-sustaining to generate electric power to drive the machine device (400) through the at least one controller (not shown) or to channel out the electric power as a power source for other electrical devices.

Figure 6A:
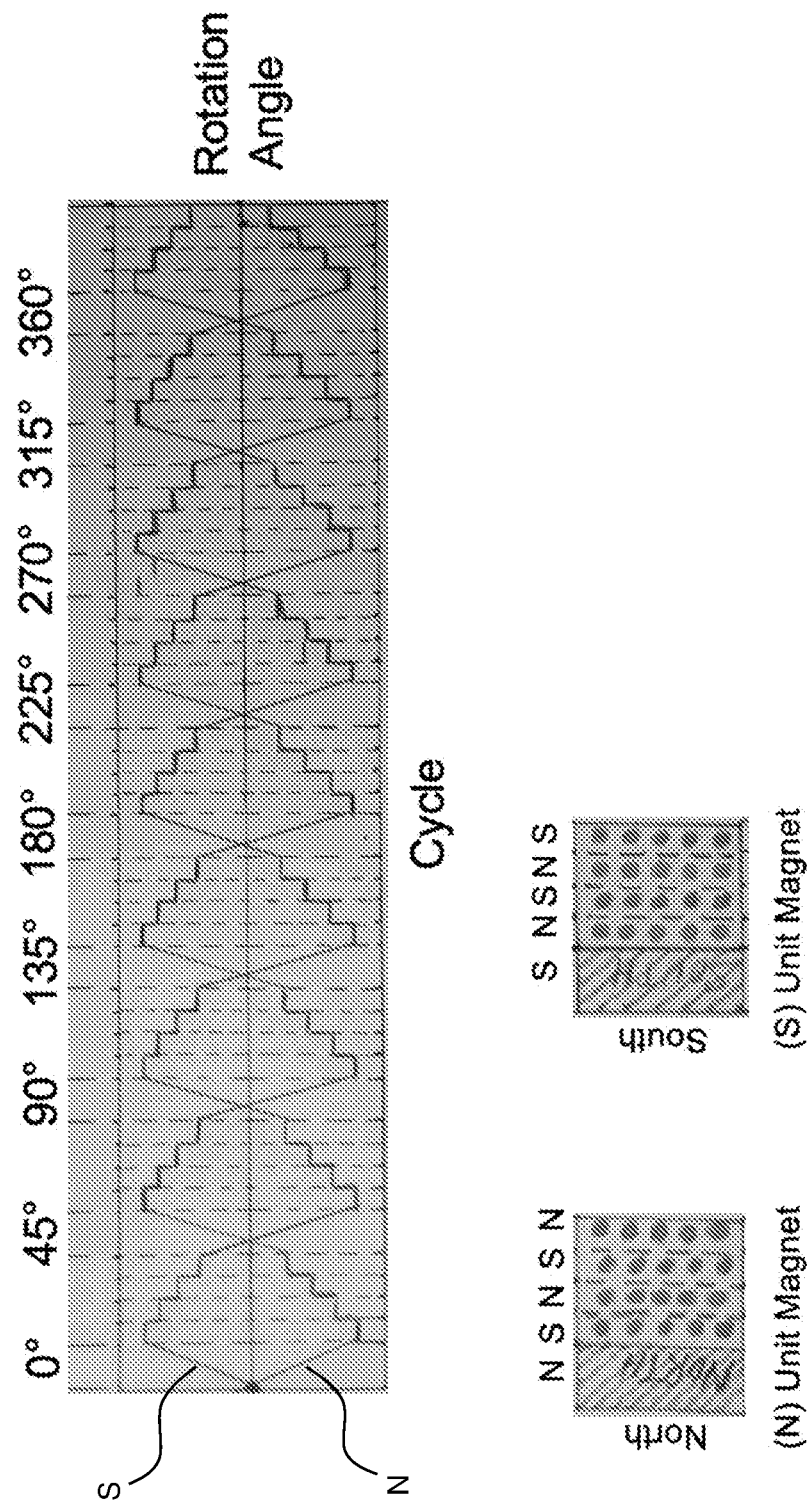
FIG. 6a is a graph illustrates an example of winding field coil cutting positions of the stator during the revolution of the rotor with magnetic poles of corresponding north-south polarity according to the preferred exemplary of the present invention.

In the preferred exemplary, the electric current is preferably formed by the cross magnetic field excitation which is a result of periodic alignment and misalignment of magnetic poles with north-south polarity in-lines provided on at least one rotor (540) and stator (520) of the generator (500) (see FIG. 6*a*). Accordingly, the cross magnetic field excitation includes magnetic wave kink flux. The magnetic wave kink is typically the magnetic field established by the magnetic field generating means (542) or permanent magnets configured at equally spaced intervals around the inner circumference drum of the rotor (540). It should be noted that a direction of the magnetic wave kink flux supplied on to the winding field coil (522) of the stator (520) in the magnetic poles with north-south polarity arrangement must be synchronized, meaning that the magnetic field from the magnetic field generating means (542) of at least one rotor (540) as needed in the winding field coils (522) of at least one stator (520) for cross magnetic field excitation must be of the corresponding polarity to the winding field coils (522) of the stator (520). Accordingly, the winding field coils (522) of at least one stator (520) will be energized whenever resultant force is in the opposite direction and then for a period less than the period during which the resultant force changes from zero to a maximum and back to zero.

Figure 6B:
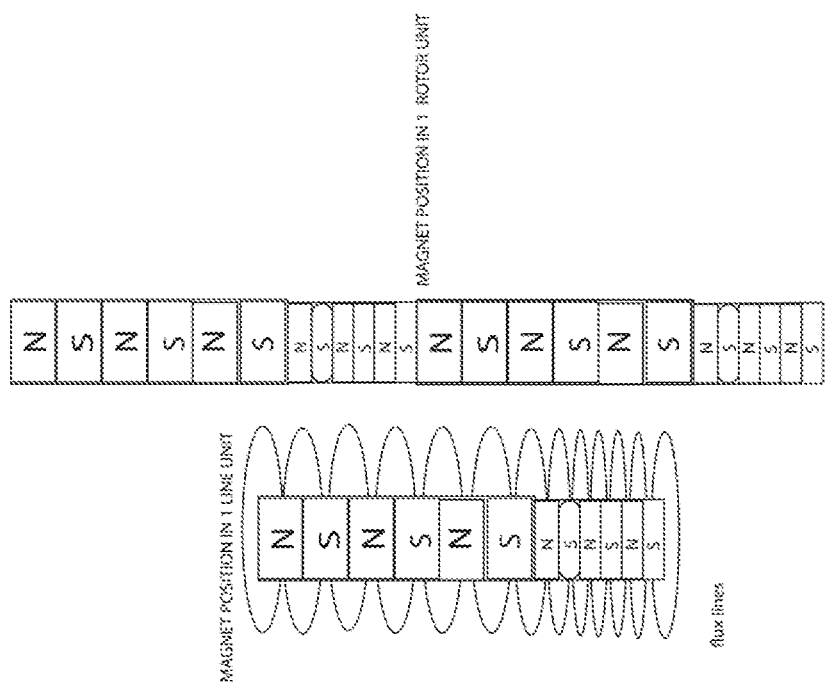
FIG. 6b is a schematic view that shows an example of north-south polarity magnets/magnetic poles in the rotor, as well as the flux lines, in accordance with the preferred exemplary of the present invention.

By way of example but not limitation, FIG. 6*b* shows an example of north-south polarity magnets/magnetic poles in the rotor, as well as the flux lines, in accordance with the preferred exemplary of the present invention. Instead of configured in equally spaced intervals, the magnetic field generating means (542) or permanent magnets may also be configured in descending order from larger to smaller array sequences, or vice versa, around the inner circumference drum of the rotor (540). Such arrangement allows the magnetic field excitation or the main flux to flow axially through the rotor (540) or flow circumferentially along with the rotor (540) inner surface. With the magnetic field generating means (542) or permanent magnets located at the inner surface of the drum of the rotor (540), it is not necessary for a ferromagnetic magnet rotor core. Thus, the axial length is substantially reduced, which improves the power density of the machine generator. It will be noted that in the places in between winding, a few low gauss magnets may be filled so as to increase the robustness and provide better flux cutting for the coil of the stator (520). A lower revolution of 500 to 600 rpm may be used to generate sufficient power, thus the efficiency of the generator increases.

It should be noted that the generator (500) for clean, renewable, and sustainable power generation of the present invention, although exemplary, will be used herein in describing the functions of the present invention. The generator (500) of the present invention may also be applicable for use in other types of power generation, such as for example, but not limited to, a portable small-scale power module system, a middle-scale power station system, or a large-scale power plant generating system, whenever deemed suitable for its intended purposes.

It should also be noted that the apparatuses, components or parts, materials, as well as configurations and arrangements of various elements used to carry out the abovementioned generator are illustrative and exemplary only and are not restrictive of the invention. One of ordinary skill in the art will recognize that those apparatuses, components or parts, materials, as well as configurations and arrangements of various elements used herein may be altered in a manner so as to obtain different optimal effects or desired operating characteristics. As such, the above-described should not be construed as limiting in any way, but as the best mode contemplated by the inventor for carrying out the invention.

The word "exemplary" is used herein to mean serving as an example, instance, or illustration. Any embodiment described herein as "exemplary" is not necessarily to be construed as preferred or advantageous over other embodiments. Likewise, the term "embodiment" of a system, apparatus, device or article of manufacture does not require that all embodiments of the invention include the described components, structure, features, functionality, processes, advantages, benefits, or modes of operation.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention being thus described, it will be obvious that the same may be varied in many ways. Such variations are not to be regarded as a departure from the principle and scope of the invention, and all such modifications as would obvious to one skilled in the art intended to be included within the scope of following claims.

The invention claimed is:

1. A generator for clean, renewable, and sustainable power generation, comprising:
    a) at least one machine device (400) with a drive shaft (300);
    b) at least one flywheel (320) connected to the drive shaft (300);
    c) at least one stator (520) and rotor (540);
    wherein the drive shaft (300) of the at least one machine device (400) is operable to synchronously rotate the at least one rotor (540) of the generator (500);
    wherein the flywheel (320) has evenly spaced around magnetic field means (322) adapted for magnetic interaction with energizing coils (340) of at least one support (360) so as to induce rotation of the flywheel (320) in a single direction to rotate the rotor (540);
    wherein the at least one stator (520) of the generator (500) has an armature (524) with a plurality of winding field coils (522) evenly spaced apart around its circumference projected winding teeth (523), and each winding field coil (522) is adapted to be served as a collecting energizing coil or an electromagnet coil; and
    wherein the at least one rotor (540) of the generator (500) includes an array of the magnetic field generating means (542) evenly spaced apart around at its inner circumference surface, said rotor (540) is adapted to serve as a flywheel such that allowing it to eliminate magnetic flux friction caused by the sudden load and therefore lighten the rotation of the rotor (540).

2. The generator according to claim 1, wherein the at least one machine device (400) is connected to at least one power source operable to static start the machine device (400) to rotate the drive shaft (300).

3. The generator according to claim 2, wherein the at least one machine device (400) is a rotating machine that can alternately serve as a drive motor or a generator.

4. The generator according to claim 3, wherein the at least one machine device (400) is adapted to be temporarily operated as a motor with an electrical supply from the power source in order to static start the drive shaft (300) and accelerate the rotational speed of at least one rotor (540) to sufficiently start the generator (500).

5. The generator according to claim 3, wherein the at least one machine device (400) is able to switch back to working as a generator once the generator (500) begins operating to supply electric power back to the machine device (400).

6. The generator according to claim 1, wherein the evenly spaced around magnetic field means (322) of the flywheel (320), are configured with an offset angle of 18 to 25 degrees.

7. The generator according to claim 6, wherein the magnetic field means (322) of the flywheel (320) is a permanent magnet of an iron core or an energizable coils simulating magnets, or a combination thereof, with the same polarity.

8. The generator according to claim 6, wherein the evenly spaced around magnetic field means (322) of the flywheel (320), are configured with an offset angle of 20 degrees.

9. The generator according to claim 1, wherein the at least one support (360) has one or more layers of evenly spaced energizing coils (340) that are configured with an offset angle of 18 to 25 degrees.

10. The generator according to claim 9, wherein the energizing coils (340) of the at least one support (360) which are operable as an electromagnet are replaced by permanent magnet of iron core.

11. The generator according to claim 9, wherein the at least one support (360) has one or more layers of evenly spaced energizing coils (340) that are configured with an offset angle of 20 degrees.

12. The generator according to claim 1, wherein the winding field coil (522) of the at least one stator (520) is adapted to be energized by back electromotive force (EMF) more than once in a single revolution of the rotor (540).

13. The generator according to claim 1, wherein the at least one rotor (540) of the generator (500) accelerates to its rated starting speed when the rotational speed of the drive shaft (300) is increased, and such starting speed of at least one rotor (540) enables the generator (500) to generate electric power to drive the machine device (400) through the at least one controller or to channel out the electric power as a power source.

14. The generator according to claim 1, wherein the magnetic field generating means (542) of the at least one rotor (540) is a permanent magnet of an iron core, a means attractable to a magnetized body, or an electromagnet, or a combination thereof, with north-south polarity.

15. The generator according to claim 1, wherein the at least one rotor (540) of the generator (500) is further equipped with one or more clip blade fans (544) configured on at least one space opening (545) for ventilation purposes, said clip blade fans (544) being adapted to provide an aerodynamic airflow through the at least one space opening (545) of the rotor (540), such that it is able to reduce the temperature of the winding field coils (522) of the stator (520).

16. The generator according to claim 1, wherein the generator (500) is adapted to convert a rotational speed of at least one rotor (540) to electric current through cross magnetic field excitation between at least one stator (520) and rotor (540), such that the generator (500) is operable to supply electric power back to the at least one machine device (400), or to channel the electric power to at least one power output as a power source.

17. The generator according to claim 16, wherein the electric current is formed by the cross magnetic field excitation which is a result of periodic alignment and misalignment of magnetic poles with north-south polarity in-lines provided on at least one rotor (540) and stator (520) of the generator (500).

18. The generator according to claim 17, wherein the cross magnetic field excitation includes magnetic wave kink flux which is the magnetic field established by the magnetic field generating means (542) or permanent magnets configured at equally spaced intervals, in descending order from larger to smaller array sequences, or in ascending order from smaller to larger array sequences around the inner circumference drum of the rotor (540).

\* \* \* \* \*